(12) United States Patent
Liu et al.

(10) Patent No.: US 8,552,703 B2
(45) Date of Patent: Oct. 8, 2013

(54) METHOD AND APPARATUS FOR LOW STANDBY CURRENT SWITCHING REGULATOR

(75) Inventors: Jun Liu, Sunnyvale, CA (US); Zaki Moussaoui, San Carlos, CA (US); Kenneth L. Lenk, Mountain View, CA (US)

(73) Assignee: Intersil Americas Inc., Milpitas, CA (US)

( * ) Notice: Subject to any disclaimer, the term of this patent is extended or adjusted under 35 U.S.C. 154(b) by 283 days.

(21) Appl. No.: 13/109,299

(22) Filed: May 17, 2011

(65) Prior Publication Data

US 2012/0223687 A1    Sep. 6, 2012

Related U.S. Application Data

(60) Provisional application No. 61/453,219, filed on Mar. 16, 2011, provisional application No. 61/449,165, filed on Mar. 4, 2011.

(51) Int. Cl.
*G05F 1/00* (2006.01)

(52) U.S. Cl.
USPC .......................................... 323/283; 323/271

(58) Field of Classification Search
USPC ................................. 323/271, 283
See application file for complete search history.

(56) References Cited

U.S. PATENT DOCUMENTS

| | | | |
|---|---|---|---|
| 5,559,423 A * | 9/1996 | Harman | 323/277 |
| 5,773,966 A | 6/1998 | Steigerwald | |
| 6,229,289 B1 | 5/2001 | Piovaccari et al. | |
| 6,636,023 B1 * | 10/2003 | Amin | 323/268 |
| 7,064,531 B1 | 6/2006 | Zinn | |
| 7,148,670 B2 | 12/2006 | Inn et al. | |
| 7,679,316 B2 | 3/2010 | Guthrie et al. | |
| 8,169,202 B2 * | 5/2012 | Chen | 323/273 |
| 2005/0088856 A1 | 4/2005 | Yamamoto et al. | |
| 2007/0090821 A1 * | 4/2007 | Imai et al. | 323/284 |
| 2008/0054873 A1 | 3/2008 | Inoue | |
| 2008/0303492 A1 | 12/2008 | Aiura et al. | |
| 2010/0231190 A1 * | 9/2010 | Falvey et al. | 323/284 |

FOREIGN PATENT DOCUMENTS

EP    1681760 A2    7/2006

OTHER PUBLICATIONS

Ye, Yidie et al. "PWM/PSM Dual-mode Controller for High Efficiency DC-DC Buck Converter." Power and Energy Engineering Conference (APPEEC). 2010 Asia-Pacific IEEE, Piscataway, NJ, USA. Mar. 28, 2010. pp. 1-4. XP031658250, ISBN: 978-1-4224-4812-8.

* cited by examiner

*Primary Examiner* — Adolf Berhane
*Assistant Examiner* — Emily P Pham
(74) *Attorney, Agent, or Firm* — Gary Stanford

(57) ABSTRACT

A regulator controller which controls conversion of an input voltage to an output voltage, including a switching regulator, a low dropout (LDO) regulator, and a mode controller. The switching regulator develops a pulse control signal to regulate the output voltage when enabled. The LDO regulator also regulates the output voltage when enabled. The mode controller enables or disables the switching regulator and the LDO regulator based on a load condition. The switching regulator is enabled and the LDO regulator is disabled during normal operation. The LDO regulator is enabled when the low load condition is detected, such as a skipped pulse on the pulse control signal. The switching regulator is disabled when the pulse control signal reaches a minimum level. The LDO regulator is disabled and the switching regulator is re-enabled based on threshold conditions of the current output of the LDO regulator.

22 Claims, 6 Drawing Sheets

METHOD AND APPARATUS FOR LOW STANDBY CURRENT SWITCHING REGULATOR

CROSS-REFERENCE TO RELATED APPLICATIONS

This application claims the benefit of U.S. Provisional Application Ser. No. 61/449,165, filed on Mar. 4, 2011, and U.S. Provisional Application Ser. No. 61/453,219, filed on Mar. 16, 2011, which are both hereby incorporated by reference in their entireties for all intents and purposes.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
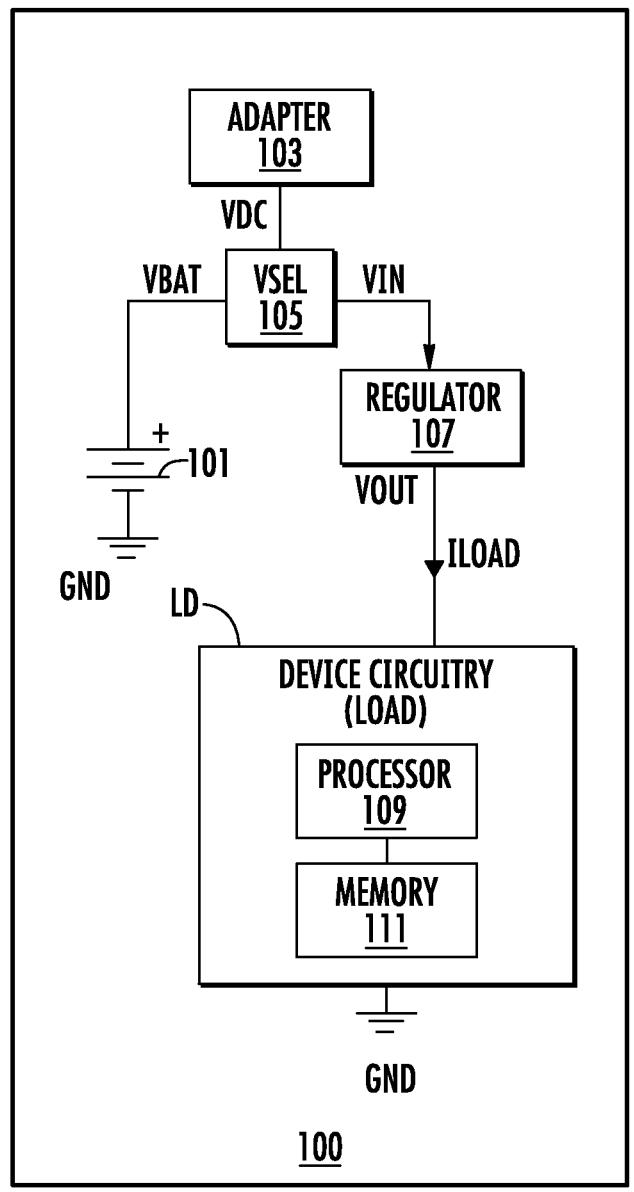
FIG. 1 is a block diagram of an electronic device including a DC-DC switching voltage regulator implemented according to an exemplary embodiment of the present invention.

FIG. 1 is a block diagram of an electronic device 100 including a DC-DC switching voltage regulator 107 (otherwise referred to as a converter or power supply or the like) implemented according to an exemplary embodiment of the present invention. The electronic device 100 is shown including a battery 101 providing a battery voltage VBAT to one input of a voltage select (VSEL) circuit 105, having another input receiving a DC voltage (VDC) from an adapter 103. The adapter 103 receives AC or DC voltage from an external power source, such as an alternating current (AC) source (not shown), and converts the received voltage to the VDC voltage. If the battery 101 is rechargeable, then the adapter 103 may include a battery charger for charging the battery 101 or a separate battery charger (not shown) may be included. The VSEL circuit 105 provides an input voltage VIN to an input of the voltage regulator 107. The voltage regulator 107 has an output providing an output voltage VOUT, which is used to provide source voltage to a load LD. The load LD generally includes the circuitry of the electronic device 100, which receives a load current ILOAD. As shown, the LD may include a processor 109 coupled to a memory 111, both receiving supply voltage from the regulator 107 (e.g., VOUT). Other types of electronic devices that do not have a processor or memory are also contemplated.

The electronic device 100 may be any type of electronic device, including mobile, portable, or handheld devices, such as, for example, any type of personal digital assistant (PDA), personal computer (PC), portable computer, laptop computer, etc., cellular phone, personal media device, etc. The electronic device 100 may also be implemented for the automotive industry such as provided within an automobile or the like, in which the adapter 103 is an alternator system or the like and the battery 101 is an automotive battery. In an alternative embodiment, the electronic device 100 is not battery-powered and is powered by an AC source or other source of power. In general, the voltage regulator 107 is configured as a power regulator for computer, industrial, consumer, etc., applications and/or battery-powered applications.

The primary functions of the electronic device 100 are performed by the load LD which is the device circuitry in the illustrated configuration. In one embodiment the battery 101 is a rechargeable battery of any suitable type (including and automotive batteries), although non-rechargeable batteries are contemplated. In various embodiments the voltage of VIN is below VOUT for a boost configuration, VIN is above VOUT for a buck configuration, or VIN relative to VOUT may range anywhere between for various other configurations, such as, for example, a single-ended, primary-inductor converter (SEPIC) or buck-boost converts or the like.

In portable and/or battery-powered applications including automotive applications, light load efficiency is important for switching power regulators. Many such applications, for example, include a low power mode, such as a standby mode or the like. One scheme to achieve high efficiency during light load conditions is pulse frequency modulation (PFM) or a pulse skipping scheme. The PFM mode of operation often causes electromagnetic interference (EMI) issues and/or large output ripples, which may not be acceptable for many configurations. Low dropout (LDO) mode of operation has low quiescent input current and it operates at standby condition when the load current is very small, e.g., less than 10 milli-amperes (mA). The output of a LDO regulator is free of ripple voltage. The challenges are system configurations and how to achieve smooth transitions between the switching mode and LDO mode.

The voltage regulator 107 is implemented with a novel LDO mode and control scheme to achieve high efficiency at standby mode or the like and smooth transitions between switching and LDO modes of operation. In one embodiment, an LDO regulator 215 (FIG. 2) need only be implemented sufficiently large to handle the relatively small standby current. Thus, the relatively small LDO regulator 215 minimizes silicon area and added cost. A novel transition control scheme is proposed and smooth transitions between switching (e.g., PWM) mode and LDO mode is achieved. With an LDO mode, the voltage regulator 107 consumes extremely low input quiescent current in strand-by conditions and clean output voltage with less ripple than the normal pulse width modulation (PWM) or switching mode.

Figure 2:
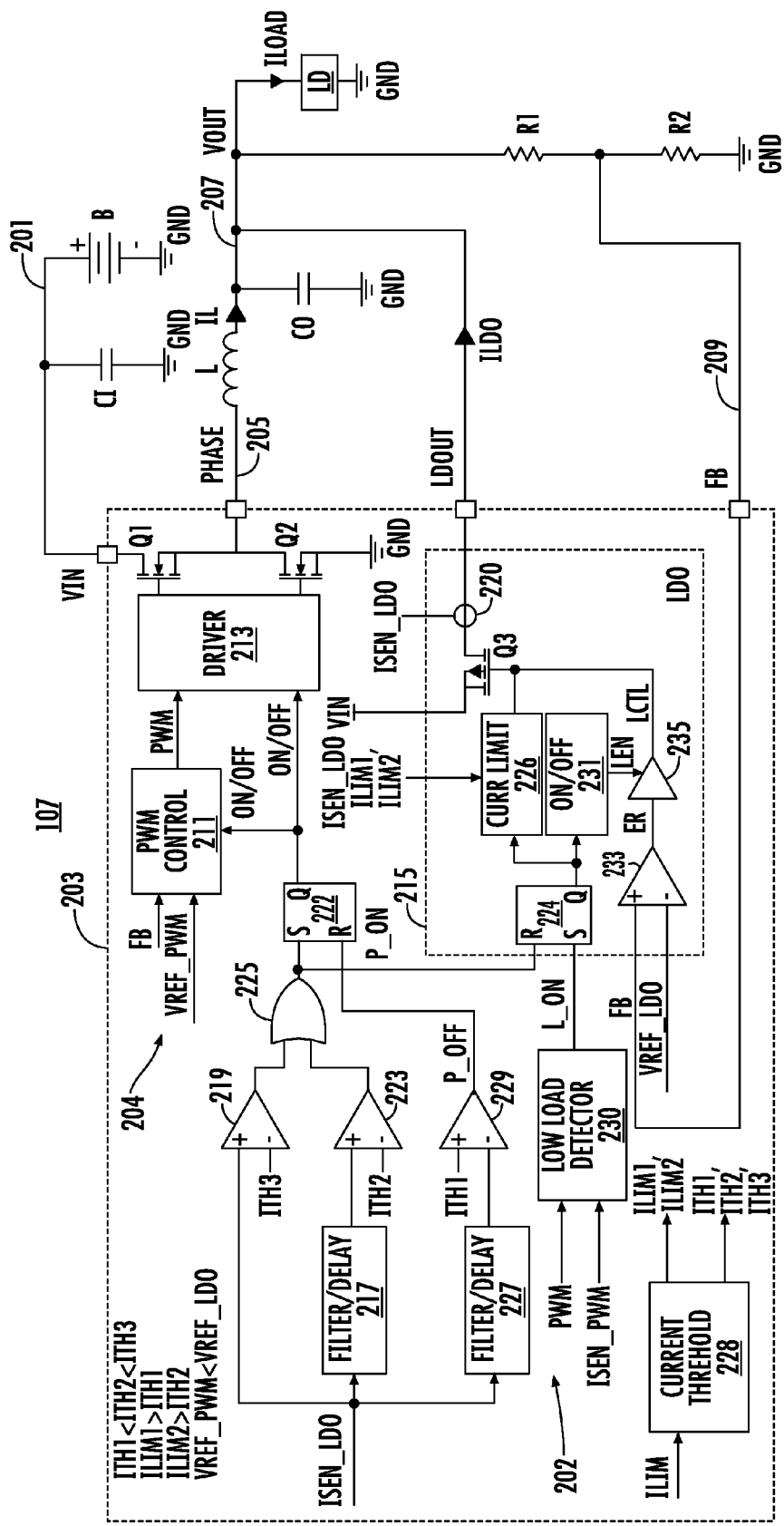
FIG. 2 is a simplified schematic and block diagram of the voltage regulator of FIG. 1 including a low standby current switching regulator according to one embodiment of the present invention.

FIG. 2 is a simplified schematic and block diagram of the voltage regulator 107 according to one embodiment of the present invention. A battery B is shown providing the input voltage VIN to an input voltage node 201 filtered by an input capacitor C1. The battery B and capacitor CI are coupled between the input voltage node 201 and GND. The battery B represents the output from the VSEL circuit 105, which may be generated by the battery 101 or from another source as previously described. VIN is provided to an input of a regulator controller 203. In one embodiment, the regulator controller 203 is configured on an integrated circuit (IC) or semiconductor chip or the like. It is noted, however, that the regulator controller 203 may be configured in a discrete manner. An output inductor L is coupled between a PHASE node 205 and an output node 207 developing the output voltage VOUT. VOUT is filtered by an output capacitor CO coupled between an output node 207 and GND. The load LD is also coupled between output node 207 and GND for receiving VOUT as the supply voltage and the load current ILOAD is provided to the load LD. VOUT is divided by a voltage divider including resistors R1 and R2, which are coupled between output node 207 and GND providing an intermediate feedback node 209 developing a feedback signal FB. FB, VIN and PHASE are provided to respective input/output (I/O) connections of the regulator controller 203. The regulator controller 203 also includes LDO I/O connection LDOOUT providing an LDO current ILDO.

The regulator controller 203 is shown including a pulse width modulation (PWM) regulator 204, the LDO regulator 215 and a mode controller 202 for enabling or disabling the PWM regulator 204 and the LDO regulator 215 for switching operating mode between PWM (e.g., switching) and LDO. The PWM regulator 204 is shown in simplified form including a PWM controller 211, a driver network 213 and a pair of electronic switches Q1 and Q2. FB and a PWM reference voltage VREF_PWM are provided to respective inputs of the PWM controller 211, which outputs a corresponding pulse control signal PWM, in which PWM is provided to an input of the driver network 213. The driver network 213 controls operation of the electronic switches Q1 and Q2 coupled in series between VIN and GND. In one embodiment as shown, the electronic switches Q1 and Q2 are each implemented as an N-channel metal-oxide semiconductor, field-effect transistor (MOSFET), although alternative types of electronic switching devices may be used. As shown, the drain of Q1 receives VIN (via an external connection of the regulator controller 203), its source is coupled to the PHASE node 205 (via another external connection of the regulator controller 203), and its gate is coupled to an output of the driver network 213. The drain of Q2 is coupled to the PHASE node 205, its source is coupled to GND, and its gate is coupled to another output of the driver network 213. In alternative embodiments, the switches Q1 and Q2 and/or the driver network 213 are provided externally to the regulator controller 203.

The PWM regulator 204 employs closed loop control to supply ILOAD during normal operation. As understood by those of ordinary skill in the art, the PWM controller 211 develops the duty cycle of PWM to regulate FB to the target voltage level of VREF_PWM, thus regulating the voltage level of VOUT. Although not specifically shown, the PWM controller 211 internally compares FB with VREF_PWM to generate an error voltage indicative of the relative error of VOUT. The PWM controller 211 uses the error voltage to develop the PWM signal. The PWM controller 211 is configured according to any one or more control modes, such as voltage mode or current mode or the like, for developing PWM. Control operation may be configured such that PWM frequency is fixed or variable, and various control modes of operation, such as fixed off-time, fixed on-time hysteretic control mode, etc. In one embodiment, for example, when PWM is high, the driver network 213 turns Q1 on and turns Q2 off, and when PWM is low, the driver network 213 turns Q1 off and turns Q2 on. A current IL flows through the output inductor L to develop VOUT across the output capacitor CO. The PWM controller 211 monitors FB for controlling the duty cycle of PWM. Switching operation repeats in this manner for the buck-type converter configuration during PWM mode of operation to convert the higher voltage VIN to the lower regulated voltage VOUT.

The LDO regulator 215 also uses closed loop control to regulate VOUT during LDO mode of operation. The LDO regulator 215 includes a current sensor 220, an error amplifier 233, a driver 235, a power device Q3, an enable circuit 231, a set-reset flip-flop (SRFF) 224, and a current limiter 226. The error amplifier 233 has a non-inverting input receiving FB, an inverting input receiving an LDO reference voltage VREF_LDO, and an output developing an error voltage ER. ER is provided to the input of the driver 235, which has its output providing an LDO control signal LCTL for driving the gate of the power device Q3. In one embodiment, the power device Q3 is a P-channel MOSFET (or PFET) having a source coupled to receive the input voltage VIN, a drain for coupling to the output node 207, and a gate coupled to the output of the driver 235. Other types of power devices are contemplated, such as a power PNP bipolar junction transistor or the like. The current sensor 220 senses current ILDO provided via the LDO output LDOOUT of the regulator controller 203 and provides a corresponding current sense signal ISEN_LDO. The driver 235 has an enable input coupled to an output of the enable circuit 231 for receiving an enable signal LEN. The SRFF 224 has a Q output provided to corresponding inputs of the current limiter 226 and the enable circuit 231. The current limiter 226 is coupled to receive LCTL (at the gate of Q3). The current limiter 226 also receives ISEN_LDO and current limit signals ILIM1 and ILIM2.

When the LDO regulator 215 is disabled, the enable circuit 231 disables or otherwise turns off the driver 235, which turns off the power device Q3. When off, Q3 develops a high impedance (e.g., between the source and drain of PMOSFET device) so that it is effectively taken out of the control loop. When the LDO regulator 215 is enabled, the enable circuit 231 enables or otherwise turns on the driver 235. The driver 235 drives the power device Q3 in accordance with the ER output of the error amplifier 233 to regulate VOUT. In one embodiment, the impedance of Q3 is adjusted based on ER to regulate VOUT to a desired voltage level under various VIN and load conditions.

The mode controller 202 includes a first filter/delay network 227, a second filter/delay network 217, comparators 219, 223 and 229, a 2-input logic OR gate 225 an SRFF 222, a low load detector 230, and a current threshold network 228. The filter/delay network 227 receives ISEN_LDO and has an output coupled to the inverting input of comparator 229. A first threshold voltage ITH1 is provided to the non-inverting input of comparator 229, which has its output providing a signal P_OFF to the reset (R) input of the SRFF 222. The filter/delay network 217 receives ISEN_LDO and has an output coupled to the non-inverting input of comparator 223. A second threshold voltage ITH2 is provided to the inverting input of comparator 223, which has its output provided to one input of the OR gate 225. ISEN_LDO is provided to the non-inverting input of the comparator 219, which receives a third threshold voltage ITH3 at its inverting input and which has an output coupled to the other input of the OR gate 225.

The output of the OR gate 225 is couple to the set (S) input of the SRFF 222. The Q output of the SRFF 222 provides a signal ON/OFF to an enable input of the driver network 213 and to an enable input of the PWM controller 211. The ON/OFF signal enables or disables the PWM regulator 204.

When the SRFF 222 asserts ON/OFF high, the PWM regulator 204 is enabled, so that the PWM controller 211 develops the PWM signal provided to the driver network 213. The driver network 213 is enabled and drives switching of Q1 and Q2 for regulating VOUT to a predetermined voltage level based on VREF_PWM based on PWM. When the SRFF 222 asserts ON/OFF low, the PWM regulator 204 is disabled, in which the PWM controller 211 and the driver network 213 are both disabled.

Figure 5:
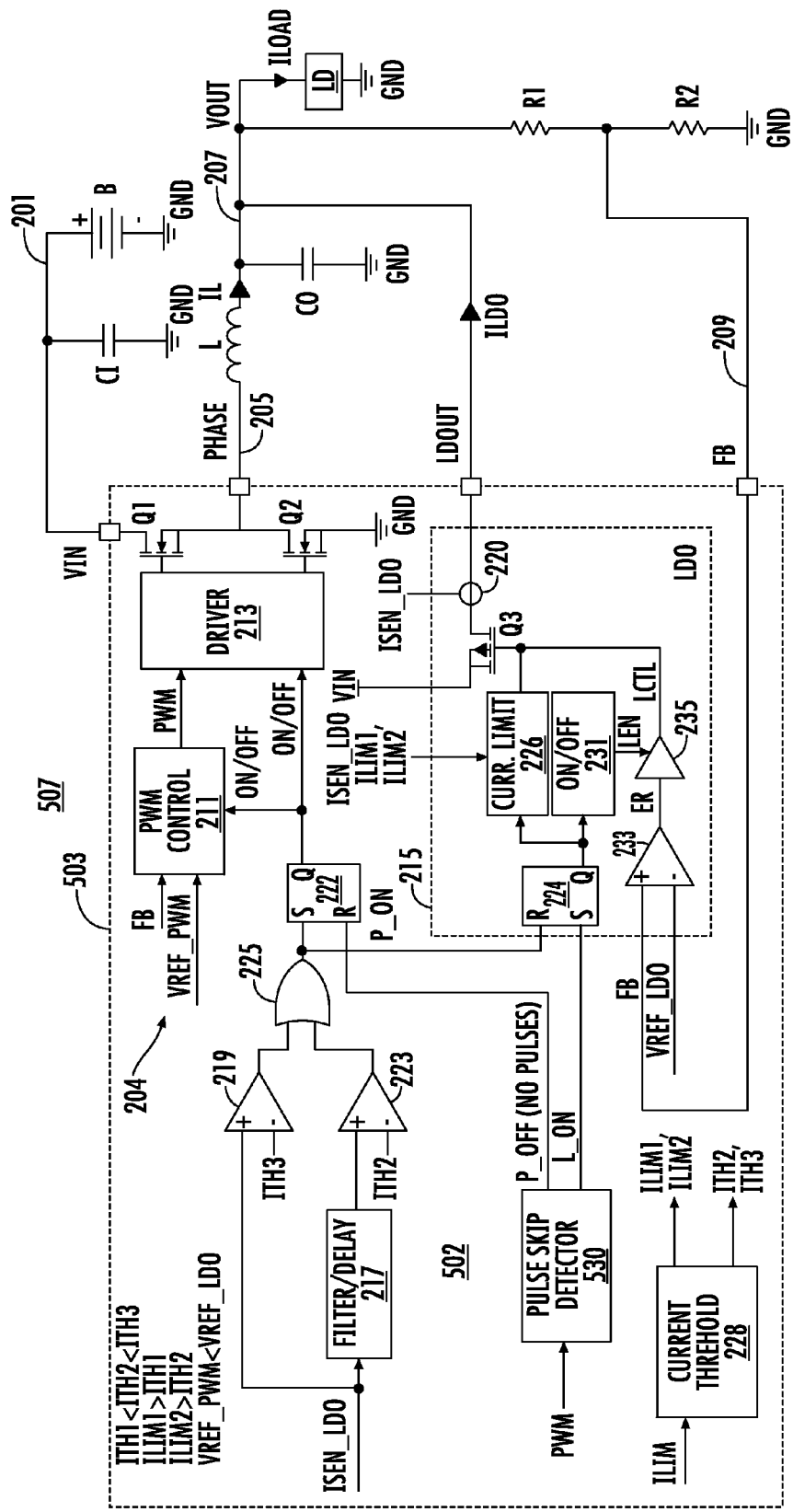
FIG. 5 is a simplified schematic and block diagram of a voltage regulator according to another embodiment of the present invention, which uses pulse skipping to determine when to enable LDO mode and which detects minimal or zero pulses to determine when to disable the PWM regulator.

The PWM signal is provided to an input of the low load detector 230, which has an output providing a signal L_ON to the set input of the SRFF 224. The output of the OR gate 225 is provided is provided to the reset input of the SRFF 224. In one embodiment, the PWM controller 211 is configured to implement pulse skipping during low load conditions, and the low load detector 230 includes or otherwise incorporates a pulse skipping detector which detects any skipped pulses on the PWM signal. When at least one pulse on the PWM signal is skipped, then the pulse skipping detector of the low load detector 230 asserts the L_ON signal high to set the SRFF 224 and enable the LDO regulator 215. FIG. 5, described below, further illustrates and describes the pulse skipping scheme.

In an alternative embodiment, the low load detector 230 includes or otherwise incorporates a comparator network or the like for determining when one or more pulses on PWM have a minimum duration indicating a low load condition. For example, if the PWM controller 211 is not configured for pulse skipping but instead provides minimum PWM pulses during low load, then the low load detector 230 detects the minimum PWM pulses and asserts L_ON high to enable the LDO regulator 215. In a minimum on-time configuration, there is a practical limitation for minimum pulses to keep the system in regulation.

A current sense signal ISEN_PWM is shown provided to another input of the low load detector 230. In one embodiment, ISEN_PWM is a current signal representing the inductor current IL through the output inductor L. In one embodiment, the current through the lower switch Q2 is converted to ISEN_PWM. In another embodiment, the current through the upper switch Q1 is converted to ISEN_PWM. In another embodiment, the current through the output inductor L is sensed by an external current sensor (not shown) and provided to the regulator controller 203 via another I/O connection (not shown). In another embodiment, a combination of these methods may be employed. In one embodiment, the low load detector 230 compares ISEN_PWM with a threshold value indicative of low load. In one embodiment, the threshold value indicates that the current through the inductor L reverses and goes negative. In any of these embodiments, when ISEN_PWM indicates a low load condition, the low load detector 230 asserts L_ON high to enable the LDO regulator 215.

In one embodiment, only PWM is provided and the low load detector 230 senses one or more skipped PWM pulses or one or more minimum pulses for detecting the low load condition. In another embodiment, only ISEN_PWM is provided and the low load detector 230 senses ISEN_PWM reaching a predetermined low level for detecting the low load condition. In another embodiment, any combination of these methods may be employed.

The current threshold network 228 receives at least one current limit value ILIM and provides one or more current limit values, e.g., ILIM1 and ILIM2, and one or more current threshold values, e.g., ITH1, ITH1 and ITH3. In one embodiment, ILIM is a programmable value and used to determine the values of ILIM1-2 and ITH1-3. For example, each of the current limit values ILIM1-2 and current threshold values ITH1-3 are determined by a corresponding multiple of ILIM. In another embodiment, one or more of the current limit and current threshold values are separately programmable. As shown, the current limit values ILIM1-2 are provided to the current limiter 226 and the current threshold values ITH1-3 are provided inputs of the comparators 229, 223 and 219.

ILIM1 and ILIM2 are current limit values used by the current limiter 226 to set the maximum value of ILDO when the LDO regulator 215 is enabled, in which ILIM2>ILIM1. During normal operating mode, the LDO regulator 215 is disabled, and ON/OFF is high so that the PWM regulator 204 is enabled and regulating the voltage level of VOUT based on VREF_PWM. When the load sufficiently decreases to a low level indicative of standby mode, the low load detector 230 asserts L_ON to enable the LDO regulator 215. In particular, L_ON goes high setting the SRFF 224 so that its Q output goes high. The SRFF 224 causes the enable circuit 231 to assert LEN to enable the driver 235. The driver 235 asserts LCTL to drive Q3 to begin regulating VOUT based on the level of VREF_LDO. When the LDO regulator 215 is first turned on or enabled in this manner, the current limiter 226 defaults to the lower current limit value ILIM 1. Thus, the current limiter 226, which senses ILDO via ISEN_LDO, initially limits ILDO to ILIM1. Since the PWM regulator 204 is still enabled and active, this is a dual mode of operation in which the PWM regulator 204 and the LDO regulator 215 are both enabled and the output of the LDO regulator 215 is limited to ILIM1.

In one embodiment, since VREF_LDO>VREF_PWM, the LDO regulator 215 attempts to increase VOUT to the level based on VREF_LDO while the PWM regulator 204 attempts to keep VOUT to the lower voltage level based on VREF_PWM. The current limiter 226 limits ILDO to a current level based on ILIM1, and since the LDO regulator 215 is contributing current (ILDO limited to ILIM1), the PWM regulator 204 slows to a minimum level or even reaches an over-voltage condition and stops regulating as FB rises above VREF_PWM during the standby or low-load conditions.

In one embodiment, the LDO regulator 215 implements a "foldback" function. When ILDO approaches the applicable current limit level, e.g., ILIM1, the LDO regulator 215 reduces the regulation level below VREF_LDO, such as to essentially maintain a relatively constant output power, when reaching the applicable current limit level. In this manner, even though VREF_LDO may be greater than VREF_PWM in an embodiment, the LDO regulator 215 allows regulation at the lower voltage level set by VREF_PWM and the LDO regulator 215 contributes current but does not contend with the PWM regulator 204. As described below, when the PWM regulator 204 is disabled, the current limiter 226 increases the current limit level to ILIM2. The foldback function may be employed at the higher current limit of ILIM2 in similar manner.

ITH1, ITH2 and ITH3 represent relatively low threshold levels of ILDO in which I3>I2 >I1. Also, ILIM1 is greater than ITH1 (ILIM1>ITH1) and ILIM2 is greater than ITH2 (ILIM2 >ITH2). In each case, the difference between the ILIM value and the corresponding ITH value may be relatively small (such as a few mA or the like). When ILDO decreases such that ISEN_LDO falls below I2 and I3, then the output of the OR gate 225 goes low. The PWM regulator 204 remains enabled while ISEN_LDO remains above ITH1 so that the PWM regulator 204 is still active. When ILDO decreases such that ISEN_LDO stabilizes below I1 for at least a delay period determined by the filter/delay network 227, then the comparator 229 asserts P_OFF high to reset the SRFF 222. The SRFF 222 switches ON/OFF low to disable the PWM controller 211 and the driver network 213 to effectively disable the PWM regulator 204. In this LDO mode case, the PWM regulator 204 is disabled and the LDO regulator 215 remains enabled to regulate VOUT based on VREF_LDO. Further, when ON/OFF goes low, the current limiter 226 switches to the higher current limit value ILIM2 so that ILDO is operative up to ILIM2.

While in the LDO mode, if ILDO increases and stabilizes such that ISEN_LDO rises above ITH2 for at least a delay period determined by the filter/delay network 217, then the comparator 223 pulls its output high and the OR gate 225 asserts its output high to set the SRFF 222 and reset the SRFF 224. The SRFF 222 pulls the ON/OFF signal high to enable the PWM controller 211 and to enable the driver network 213 to re-enable the PWM regulator 204. The SRFF 224 pulls its Q output low so that the enable circuit 231 disables the driver 235 to effectively disable the LDO regulator 215. Also, when the Q output of SRFF 224 goes low, the current limiter 226 resets back from ILIM2 to ILIM1. In summary, if ISEN_LDO representing ILDO increases and stabilizes above ITH2 during LDO mode, then operation switches to the PWM mode in which the PWM regulator 204 is enabled and the LDO regulator 215 is disabled.

When operation switches to the PWM mode in which the PWM regulator 204 is enabled and the LDO regulator 215 is disabled while ISEN_LDO is between ITH2 and ITH3, the output current may be sufficiently low such that pulse skipping occurs or ISEN_PWM is sufficiently low to cause the low load detector 230 (or the pulse skip detector 530 of FIG. 5) to trigger L_ON and re-enable the LDO regulator 215. In this case, the dual mode becomes operative. Since the LDO regulator 215 was disabled and then re-enabled, its current limit is reset back to ILIM1 and remains at ILIM1 during the dual mode. This is advantageous since it is desired that the PWM regulator 204 provide most of the load current during dual mode since it is more efficient while ILOAD is above ITH2.

IF ILDO rises above ITH3, then the comparator 219 pulls its output high and the OR gate 225 asserts its output high to set the SRFF 222 and reset the SRFF 224. Thus, if ISEN_LDO representing ILDO rises above ITH3 during LDO mode, then operation switches to the PWM mode in which the PWM regulator 204 is enabled and the LDO regulator 215 is disabled.

In one embodiment, the filter/delay networks 217 and 227 are implemented as low pass filters or the like to implement a delay between input and output. In one embodiment, the filter and/or delay function is programmable. The filter/delay network 217 receives ISEN_LDO and provides a filtered and/or delayed version of ISEN_LDO to the comparator 223. In similar manner, the filter/delay network 227 receives ISEN_LDO and provides a filtered and/or delayed version of ISEN_LDO to the comparator 229.

Figure 3:
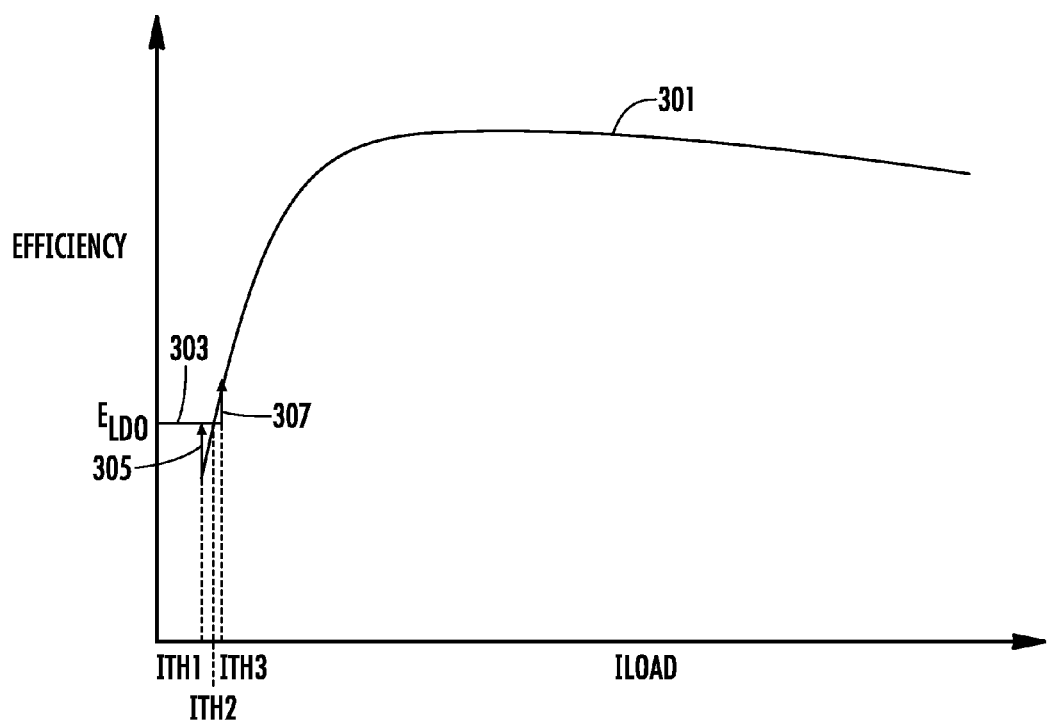
FIG. 3 is a graphic diagram plotting ILOAD versus EFFICIENCY for the voltage regulator of FIG. 1 for illustrating the threshold levels for enabling the PWM regulator and the LDO regulator.

FIG. 3 is a graphic diagram plotting ILOAD versus EFFICIENCY for the voltage regulator 107 for illustrating the threshold levels for switching between PWM, dual and LDO modes of operation. A curve 301 represents efficiency for the PWM mode of operation when only the PWM regulator 204 is enabled and a line 303 is an efficiency level $E_{LDO}$ which represents the efficiency for the LDO regulator 215. It is appreciated that the PWM regulator 204 is generally more efficient while the load current is above low or standby levels. At low load conditions when the load current is low, the efficiency of the PWM regulator 204 drops below the $E_{LDO}$ level so that the LDO regulator 215 is more efficient. When the load current drops to ITH1 and is stable at the low current level, then operation switches to LDO mode as indicated by transition arrow 305. When the load current increases above ITH3 during LDO mode, then operations switches back to PWM mode as indicated by transition arrow 307. ITH2 is between ITH1 and ITH2, and may be configured to be closer to ITH3 for when the PWM efficiency is above the $E_{LDO}$ level.

In general, when the load current is low and the efficiency of the LDO regulator 215 is higher than the PWM regulator 204, the LDO regulator 215 is enabled and the PWM regulator 204 is disabled. When the load current is higher and PWM efficiency is higher than LDO mode, the PWM regulator 204 is enabled and LDO regulator 215 is disabled. Regarding the LDO to PWM mode transition, there are two current thresholds. ITH2 is filtered with long delay by the filter/delay network 217 and then compared with LDO load current sense signal ISEN_LDO. ITH3 is more directly compared with LDO load current sense signal ISEN_LDO with the smallest filter and minimum delay. When a high load transient (e.g., large change of ILOAD versus time or di/dt) occurs during the LDO mode with a relatively large load step, the comparator 219 is trigged immediately and the PWM mode of operation is enabled quickly so that the PWM regulator 204 responds to the load transient to supply sufficient load current to achieve minimum undershoot of VOUT. It is noted that whenever ISEN_LDO goes above ITH3, even if slowly, operation transitions to the PWM mode of operation for improved response and efficiency.

When the sensed load current (e.g., ISEN_PWM representing current through upper switch Q1 during PWM, or other comparable method) increases to a level higher than ITH2 but remains lower than ITH3 such that the PWM regulator 204 has a higher efficiency than the LDO regulator 215, then it is desired to switch from the LDO mode to the PWM mode of operation if the load current becomes stable at this level. At this relatively low load level the LDO regulator 215 is able to sufficiently handle the load current but is less efficient that the PWM regulator 204. The filter/delay network 217 provides a relatively large filter with relatively long delay. If the level of the sensed load current remains stable between ITH2 and ITH3, then the comparator 223 triggers to switch to the PWM mode of operation to improve efficiency.

In one embodiment the LDO reference voltage VREF_LDO is higher than the PWM reference voltage VREF_PWM. At least one reason for this is to achieve benefits of a margin and reduced loop delay for the VOUT under-shoot at load step-up transients when the voltage regulator 107 switches from LDO mode to PWM mode.

Figure 4:
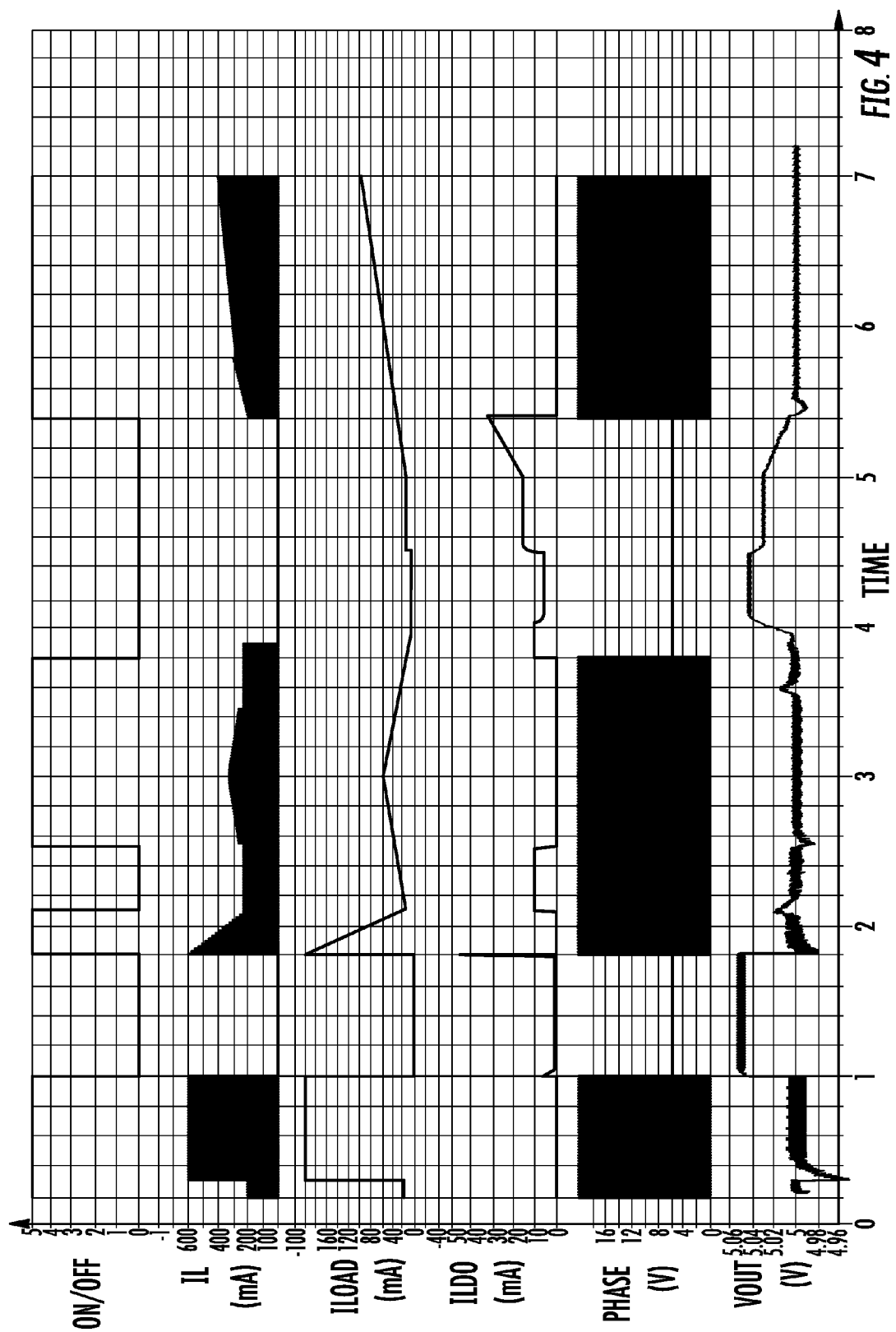
FIG. 4 shows several simulated waveforms under different load levels and load transient conditions of a voltage regulator implemented with a low standby current switching regulator according to embodiments of the present invention.

FIG. 4 is a timing diagram plotting several simulated waveforms versus time under different load levels and load transient conditions of a voltage regulator implemented with a low standby current switching regulator according to embodiments of the present invention. As shown, ON/OFF, IL (inductor current), ILOAD, ILDO (output of LDO regulator 215), the PHASE voltage and the VOUT voltage are plotted versus time under various load conditions. The waveforms illustrate that a voltage regulator implemented with a low standby current switching regulator according to embodiments of the present invention works well under various load conditions and has minimal overshoot and under-shoot at the load transient conditions either from PWM mode to LDO mode or LDO mode to PWM mode.

In one embodiment, the LDO regulator 215 is implemented using relatively small devices including a relatively small power device Q3. In one embodiment, for example, Q3 is a relatively small PFET having a size suitable to handle only relatively small standby current. In one embodiment, the standby load current is about 10 mA or less for the LDO mode of operation. For example, in a specific embodiment, ITH1 and ILIM1 are within range of about 5-10 mA, ITH2 and ILIM2 are within range of about 15-25 mA, and ITH3 is about 50 mA. These values are arbitrary and depend upon the particular implementation. Also, these values may be programmed by ILIM as previously described.

The silicon area consumed by the LDO regulator 215 is minimal and easily integrated in a power regulator IC with minimal added cost. Furthermore, the unique transition scheme between PWM and LDO modes provides smooth transition and the ability to handle load transients very well. With the LDO mode available at low loads, such as during a standby mode or the like, the voltage regulator consumes tiny input current which is critical to many battery-powered systems. The LDO mode of operation achieves ripple-free output voltage during low load or standby operation.

As described above, the regulator controller 203 operates in the dual mode when both the PWM regulator 204 and the LDO regulator 215 are both enabled. When the load current continues to decrease such that ILDO decreases below ILIM1, the LDO regulator 215 assumes most or all of the output current. If foldback is implemented as noted above, then as the current decreases, the effect of foldback decreases and the LDO regulator 215 drives the voltage of VOUT higher based on VREF_LDO and the PWM regulator 204 enters an over-voltage mode or otherwise minimizes or even stops issuing pulses on the PWM signal.

FIG. 5 is a simplified schematic and block diagram of a voltage regulator 507 according to another embodiment of the present invention. The voltage regulator 507 is substantially similar to the voltage regulator 107 in which similar components assume identical reference numbers. For the voltage regulator 507, the regulator controller 203 is replaced by a regulator controller 503, which is substantially similar to the regulator controller 203 except that the mode controller 202 is replaced by a mode controller 502. For the mode controller 502, the low load detector 230 is replaced by a pulse skip detector 530 which receives PWM and which provides the L_ON signal in a similar manner as previously described. In this case the PWM controller 211 is configured to skip pulses during low load conditions, and the pulse skip detector 530 detects one or more skipped pulses and asserts the L_ON signal to enable the LDO regulator 215 in a similar manner as previously described.

Furthermore, the filter/delay network 227 and the comparator 229 are eliminated and the P_OFF signal is provided instead by the pulse skip detector 530. As noted above, when the load current decreases during PWM mode, the PWM controller 211 begins skipping PWM pulses. The pulse skip detector 530 detects one or more skipped pulses and asserts the L_ON signal to enable the LDO regulator 215. As described above, the regulator controller 203 operates in the dual mode when both the PWM regulator 204 and the LDO regulator 215 are both enabled. When the load current continues to decrease such that ILDO decreases below ILIM1, the LDO regulator 215 assumes most or all of the output current. If foldback is implemented as noted above, then as the current decreases, the effect of foldback decreases and the LDO regulator 215 drives the voltage of VOUT higher based on VREF_LDO and the PWM regulator 204 enters an over-voltage mode or otherwise minimizes or even stops issuing pulses on the PWM signal. If the PWM signal goes to zero or provides a minimal number of pulses over a given period, the pulse skip detector 530 detects a period of no pulses and asserts the P_OFF signal to reset the SRFF 222 to disable the PWM regulator 204. In this manner, the circuitry used to detect the low current threshold ITH1 is eliminated. Instead, the PWM signal is used by the pulse skip detector 530 to determine when to disable the PWM regulator 204. The pulse skip detector 530 may assert P_OFF when a number of successive pulses are skipped.

Figure 6:
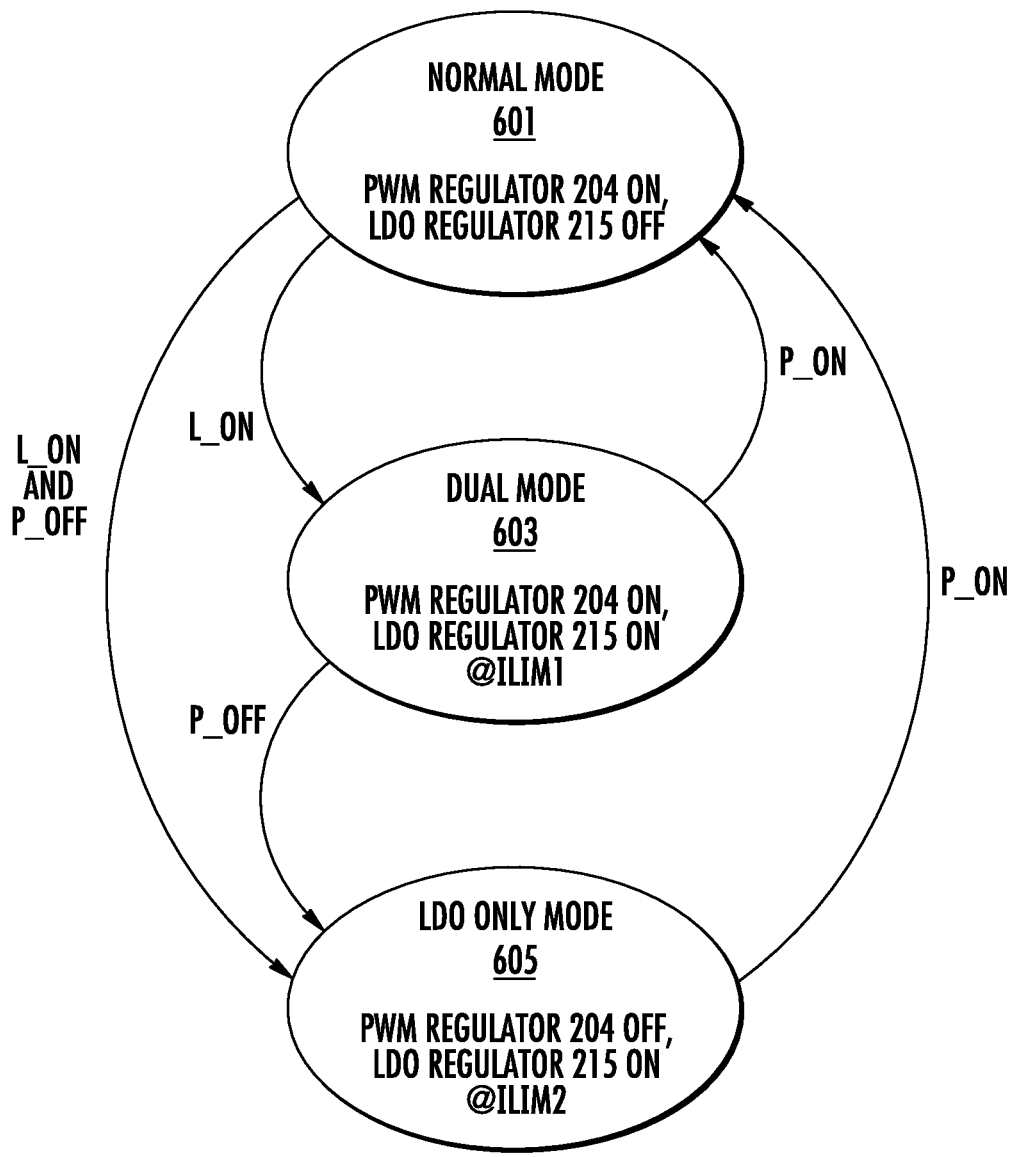
FIG. 6 is a state diagram illustrating operation of the voltage regulator or the voltage regulator for transitioning between the normal, dual and LDO only modes of operation.

FIG. 6 is a state diagram illustrating operation of the voltage regulator 107 or the voltage regulator 507. The voltage regulator generally operates in three different states, including a normal mode represented by state 601, a dual mode represented by state 603, and an LDO only mode as represented by state 605. In the normal mode state 601, the PWM regulator 204 is on and the LDO regulator 215 is off. Operation remains in the normal mode state 601 until the L_ON signal is asserted, in which case operation transfers to the dual mode state 603. The L_ON signal is asserted by the low load detector 230 for the voltage regulator 107 or by the pulse skip detector 530 for the voltage regulator 507. In general, depending upon the embodiment, the L_ON signal is asserted when a low load condition is detected, such as based on the PWM signal or based on a current sense signal (e.g., ISEN). When based on the PWM signal, L_ON is asserted upon detection of a skipped pulse on PWM or a predetermined minimum pulse duration of PWM pulses or the like. When based on ISEN, such as when ISEN falls below a predetermined minimum threshold, or when inductor current reverses and goes negative.

For the dual mode state 603, both the PWM regulator 204 and the LDO regulator 215 are turned on attempting to regulate the output voltage. The LDO regulator 215 is current limited to the lower current limit of ILIM1 as previously described. Operation remains in the dual mode state 603 until assertion of P_ON or P_OFF. P_ON is asserted whenever either one of the threshold conditions ITH2 or ITH3 are met. Both thresholds are based on comparison of the LDO regulator output current ISEN_LDO. The ITH2 threshold condition is a lower level current condition combined with a delay such as through the filter/delay network 227. Thus, when ISEN_LDO rises above ITH2 for a period of time as determined by the filter/delay network 227, then the ITH2 threshold condition is met. The ITH3 condition is a higher level current condition, and whenever ISEN_LDO rises above ITH3, the ITH3 threshold condition is met. If either the ITH2 or the ITH3 conditions are met, P_ON is asserted and operation returns to the normal mode state 601.

The P_OFF signal is asserted by the comparator 229 based on the ITH1 threshold condition, or by the pulse skip detector 530 when the PWM signal goes to zero or otherwise provides a minimal number of pulses over a given period. The ITH1 threshold condition occurs when ISEN_LDO drops below ITH1 indicating the very low load condition. When P_OFF is asserted during the dual mode state 603, transitions to the LDO only mode state 605 in which case the PWM regulator 204 is turned off while the LDO regulator 215 remains turned on. Further, the maximum current limit of the LDO regulator 215, and thus of ISEN_LDO, is increased to ILIM2. It is noted that operation may jump from the normal mode state 601 to the LDO only mode state 605 when the L_ON and P_OFF signals are asserted at or about the same time.

Operation remains in the LDO only mode state 605 until the P_ON signal is asserted. P_ON is asserted whenever either one of the threshold conditions ITH2 or ITH3 are met as previously described. When P_ON is asserted during the LDO only mode state 605, operation transitions back to the normal mode state 601.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention as defined by the following claims.

The invention claimed is:

1. A regulator controller which operates to control conversion of an input voltage to an output voltage, comprising:
   a switching regulator which receives a first signal indicative of a level of the output voltage and which develops a pulse control signal to regulate the output voltage when enabled;
   a low dropout regulator which receives said first signal and which operates to regulate the output voltage when enabled; and
   a mode controller which detects at least one load condition and which enables and disables said switching regulator and said low dropout regulator based on said at least one load condition, wherein said mode controller enables said switching regulator when operating in a normal mode and a dual mode, and wherein said mode controller enables said low dropout regulator in said dual mode and an LDO mode; and
   wherein said switching regulator regulates the output voltage to a first voltage level when enabled, wherein said low dropout regulator regulates the output voltage to a second voltage level when enabled in which said second voltage level is greater than said first voltage level, and wherein said low dropout regulator operates with foldback to enable regulating the output voltage at said first voltage level while said switching regulator and said low dropout regulator are both enabled.

2. The regulator controller of claim 1, further comprising:
   a current sensor which senses output current of said low dropout regulator and which provides a current sense signal indicative thereof; and
   wherein said mode controller comprises:
      a pulse skip detector having an input receiving said pulse control signal and an output providing a skipped pulse indication and a minimum pulse indication;
      a filter delay receiving said current sense signal and providing a first delayed current indication;
      a first comparator which compares said first delayed current indication with a first current threshold and which provides a first threshold indication;
      a second comparator which compares said current sense signal with a second current threshold and which provides a second threshold indication;
      wherein said second current threshold is greater than said first current threshold; and
      a logic network which enables said low dropout regulator when said skipped pulse indication is provided, which disables said switching regulator when said minimum pulse indication is provided, and which enables said switching regulator and disables said low dropout regulator when either one of said first and second threshold indications are provided.

3. The regulator controller of claim 2, wherein said low dropout regulator comprises a current limiter which limits said output current of said low dropout regulator to a first current limit level while said switching regulator and said low dropout regulator are both enabled, and which limits said output current of said low dropout regulator to a second current limit level while said switching regulator is disabled and said low dropout regulator is enabled, and wherein said second current limit level is greater than said first current limit level.

4. The regulator controller of claim 1, further comprising:
   a current sensor which senses output current of said low dropout regulator and which provides a current sense signal indicative thereof; and
   wherein said low dropout regulator comprises a current limiter which limits said output current of said low dropout regulator to a first current limit level while said switching regulator and said low dropout regulator are both enabled.

5. The regulator controller of claim 4, wherein said switching regulator stops providing pulses on said pulse control signal when said output current of said low dropout regulator is below said first current limit level and said low dropout regulator regulates the output voltage at the second voltage level.

6. The regulator controller of claim 4, wherein said mode controller comprises a pulse skip detector which disables said switching regulator when said switching regulator stops providing pulses on said pulse control signal, and wherein said current limiter switches to limit said output current of said low dropout regulator to a second current limit level which is greater than said first current limit level when said low dropout regulator is enabled and said switching regulator is disabled.

7. The regulator controller of claim 6, wherein said mode controller enables said switching regulator and disables said low dropout regulator when said current sense signal indicates that said output current of said low dropout regulator stabilizes above a current threshold which is between said first and second current limit levels.

8. The regulator controller of claim 6, wherein said mode controller enables said switching regulator and disables said low dropout regulator when said current sense signal indicates that said output current of said low dropout regulator rises above a current threshold which is greater than said second current limit level.

9. The regulator controller of claim 4, wherein:
   when said switching regulator and said low dropout regulator are both enabled, said mode controller disables said switching regulator when said current sense signal indicates that said output current of said low dropout regulator stabilizes to less than a first current threshold which is less than said first current limit level, and wherein said current limiter switches to limit said output current of said low dropout regulator to a second current limit level which is greater than said first current limit level; and
   wherein when said switching regulator is disabled and said low dropout regulator is enabled, said mode controller re-enables said switching regulator and disables said low dropout regulator when said current sense signal indicates that said output current of said low dropout regulator stabilizes above a second current threshold which is between said first and second current limit levels, or when said output current of said low dropout regulator rises above a third current threshold which is greater than said second current limit level.

10. The regulator controller of claim 1, wherein said mode controller comprises a pulse skip detector, wherein said at least one load condition includes a low load condition comprising at least one skipped pulse of said pulse control signal, and wherein said mode controller enables said low dropout regulator when said low load condition is detected.

11. A method capable of operating a controller of a switching regulator which regulates an output voltage, said method comprising:
receiving a sense signal indicative of the output voltage;
enabling a switching regulator when operating in a normal mode and a dual mode and enabling a low dropout regulator when operating in the dual mode and in an LDO only mode;
developing, by the switching regulator when enabled, a pulse control signal for regulating the output voltage;
controlling, by the low dropout regulator when enabled, a power device for regulating the output voltage;
sensing output current of the low dropout regulator when the low dropout regulator is enabled and providing a current sense signal indicative thereof;
detecting a load condition based on the pulse control signal and the current sense signal, wherein said detecting a load condition comprises detecting at least one skipped pulse on the pulse control signal and providing a low load indication; and
switching modes of operation between the normal, the dual, and the LDO only modes of operation based on the detected load condition, wherein said switching modes of operation comprises switching from the normal mode to one of the dual mode and the LDO only mode when the low load indication is provided during the normal mode.

12. The method of claim 11, wherein:
said developing a pulse control signal comprises developing a pulse control signal for regulating the output voltage to a first voltage level;
wherein said controlling a power device comprises controlling the power device for regulating the output voltage to a second voltage level which is greater than the first voltage level; and
further comprising operating the low dropout regulator with foldback to enable regulating the output voltage at the first voltage level during the dual mode.

13. The method of claim 11, further comprising limiting the output current of the low dropout regulator to a first current limit level during the dual mode.

14. The method of claim 13, wherein:
said developing a pulse control signal comprises developing a pulse control signal for regulating the output voltage to a first voltage level;
wherein said controlling a power device comprises controlling the power device for regulating the output voltage to a second voltage level which is greater than the first voltage level; and
wherein said developing a pulse control signal comprises skipping successive pulses when the output current of the low dropout regulator is below the first current limit level and while the low dropout regulator regulates the output voltage at the second voltage level.

15. The method of claim 13, wherein:
said switching modes of operation comprises switching from the dual mode to the LDO only mode when a successive number of pulse are skipped on the pulse control signal; and
limiting the output current of the low dropout regulator to a second current level which is greater than the first current limit level during the LDO only mode.

16. The method of claim 15, wherein said switching modes of operation comprises switching from the LDO only mode to the normal mode when the output current of the low dropout regulator stabilizes above a current threshold which is between the first and second current limit levels.

17. The method of claim 15, wherein said switching modes of operation comprises switching from the LDO only mode to the normal mode when the output current of the low dropout regulator rises above a current threshold which is greater than the second current limit level.

18. An electronic device, comprising:
device circuitry receiving a supply voltage; and
a voltage regulator providing said supply voltage, comprising:
a switching circuit which converts an input voltage to said supply voltage based on a pulse control signal;
a switching regulator which receives a voltage sense signal indicative of a level of said supply voltage and which develops said pulse control signal to regulate said supply voltage to a first voltage level when enabled;
a low dropout regulator which receives said voltage sense signal and which operates to regulate said supply voltage to a second voltage level when enabled, wherein said second voltage level is greater than said first voltage level;
wherein said low dropout regulator includes a current limiter which limits said output current of said low dropout regulator to a first current level when said switching regulator and said low dropout regulator are both enabled, and which limits said output current of said low dropout regulator to a second current level which is greater than said first current level when said switching regulator is disabled and said low dropout regulator is enabled;
a current sensor which senses output current of said low dropout regulator and which provides a current sense signal indicative thereof; and
a mode controller which receives said pulse control signal and said current sense signal and which enables and disables said switching regulator and said low dropout regulator based on said pulse control signal and said current sense signal.

19. The electronic device of claim 18, wherein said device circuitry comprises a processor coupled to a memory.

20. The electronic device of claim 18, wherein said mode controller comprises a pulse skip detector, wherein said pulse skip detector enables said low dropout regulator when at least one pulse on said pulse control signal is skipped, and wherein said pulse skip detector disables said switching regulator when said pulse control signal reaches a minimum level for at least a predetermined period of time.

21. The electronic device of claim 18, wherein said low dropout regulator implements a foldback function.

22. The electronic device of claim 18, wherein when said switching regulator is disabled and said low dropout regulator is enabled, said mode controller re-enables said switching regulator and disables said low dropout regulator when said output current of said low dropout regulator stabilizes above a first current threshold or rises above a second current threshold which is greater than said first current threshold.

* * * * *